A. W. CASH.
PRESSURE AND VACUUM RELIEF VALVE.
APPLICATION FILED APR. 28, 1919.

1,342,985.

Patented June 8, 1920.

Inventor:
Arthur W. Cash

UNITED STATES PATENT OFFICE.

ARTHUR W. CASH, OF DECATUR, ILLINOIS, ASSIGNOR TO A. W. CASH CO., OF DECATUR, ILLINOIS, A CORPORATION OF ILLINOIS.

PRESSURE AND VACUUM RELIEF VALVE.

1,342,985.  Specification of Letters Patent.  Patented June 8, 1920.

Application filed April 28, 1919. Serial No. 293,247.

*To all whom it may concern:*

Be it known that I, ARTHUR W. CASH, a citizen of the United States, residing at Decatur, in the county of Macon and State of Illinois, have invented certain new and useful Improvements in Pressure and Vacuum Relief Valves, of which the following is a specification.

This invention relates to pressure and vacuum relief valves and the principal object is to provide a valve of this character, which is simple and strong in construction, may be manufactured economically and assembled quickly and readily and yet seat accurately and tight enough to accomplish its purposes.

A further object of this invention is the provision of such a valve including an outlet valve and an inlet valve, the resilient pressure holding the outlet valve to its seat being adjustable without the necessity of taking the valve apart, the resilient pressure on the inlet valve being adjustable without disconnecting the valve from the pipe.

These valves are designed primarily for use in connection with tanks or other receptacles for storing oil and similar fluids and are provided so as to release the air or gas pressure from the closed tank when the same is being filled with the fluid and the pressure reaches or exceeds a predetermined maximum, and also to admit air into the tank or other receptacle when the fluid is withdrawn so as to overcome the vacuum formed by the withdrawal of the oil or other fluids and to permit this fluid to flow out or be discharged freely.

To the accomplishment of the foregoing and such other objects as may hereinafter appear, my invention consists in the construction, combination and arrangement of parts hereinafter described and then sought to be defined in the appended claims, reference being had to the accompanying drawings forming a part hereof and which shows merely for the purpose of illustrative disclosure, a preferred embodiment of my invention, it being expressly understood, however, that various changes may be made in practice within the scope of the claims without digressing from my inventive idea.

In the drawings—

Figure 1:
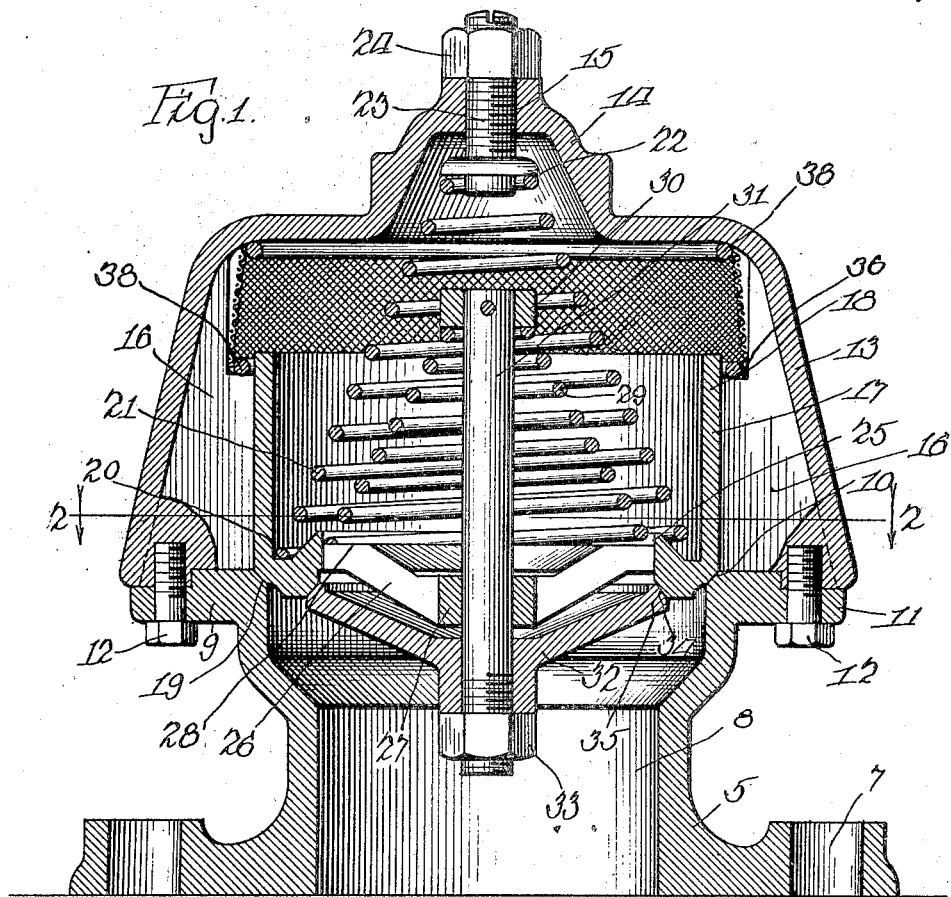
Figure 1 represents a vertical section taken through the valve as a whole, showing both valve members closed upon their seats.
Figure 2:
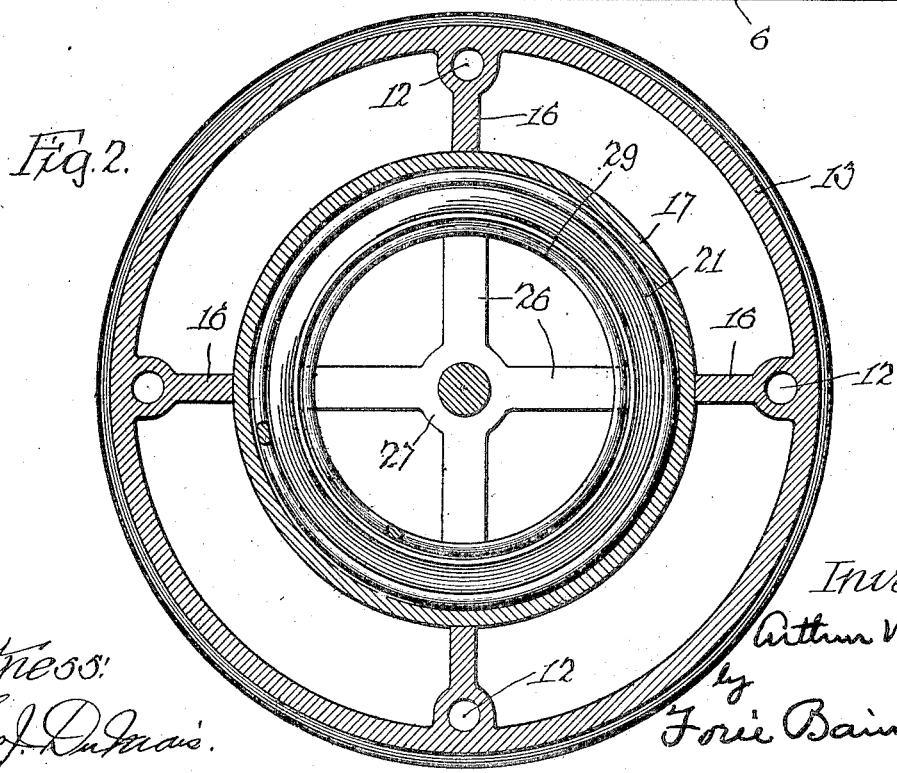
Fig. 2 is a horizontal transverse cross section taken substantially on line 2—2 of Fig. 1.

Referring now to the drawing, the numeral 5 designates the body of the valve which is formed with the annular securing flange 6 which is suitably apertured, as at 7, to receive a securing means whereby it is mounted in position in connection with a pipe or other connection leading to the tank or other receptacle above referred to. This body is provided with the passage 8 therethrough and has its upper or outer end formed with an outwardly extending annular flange 9, and is also formed with the seat 10 on its inner edge for the outlet valve of the device. This lateral flange is also provided with step down ears 11 which are apertured to receive the bolts or other securing means 12, whereby the hood member 13 is mounted and securely held in position on the body member of the valve. This hood member 13 is substantially bell shaped, having the head or extension 14 at its top, apertured, as at 15, for a purpose to be hereinafter described. It is wider than the body part so that atmospheric pressure has access to the interior thereof. This hood member is also provided with a plurality of guiding fins, flanges or members 16 which project inwardly from the inner surface thereof at intervals about its circumference to form a guiding means for the cylindrical part 17 of the outlet valve member 18, which has the valve member proper 19 resting on the seat 10 of the body member, as clearly shown in Fig. 1. This outlet valve member 18 is provided with a spring seat 20 to receive the lower end of the conical spring 21, the upper end of which engages the flange member 22 on the lower end of the adjusting screw 23 which is screwed into aperture 15 and held in place by lock nut 24.

The outlet valve member 18 is also provided inside its cylindrical part with an annular shoulder 25 to which extend the spider arms or members 26 which radiate from the hub 27, and the outer parts of which are flat, as at 28, to form a seat for the conical spring 29, the lower end of which rests thereon. The upper end of this spring 29 engages the abutment member 30 on the end of rod or shaft 31, which extends downwardly passing through hub 27 and having the inlet valve 32 mounted on the lower end thereof and held in place by a nut or similar securing means 33. The outlet valve 18 is formed on its lower face with another valve seat 34 which is adapted to receive the seating part 35 of inlet valve 32, this inlet valve being normally held in place against said seat by means of spring 29, as is obvious.

It is to be noted that the fin or flange members 16 are cut away below the line of the top edge of the cylindrical part 17 of the outlet valve to form the shoulders 36, on which shoulders the strainer member 37 is mounted. This strainer member is held in place by means of the wire ring members 38 which may be secured to the strainer or not, as desired. This arrangement prevents dirt and other impurities entering with the air through the inlet valve.

The operation and advantages of this device are as follows:

When the tank or other receptacle is being filled with oil or other fluid and the air and gas pressure exceeds the maximum determined by the pressure of spring 21 and the position of the adjusting bolt 23, the pressure will lift valve member 18, raising the same off the seat 10 and permitting the excess air and gas to escape from beneath the bell shaped hood, until the pressure falls to the predetermined point, when spring 21 will act to seat the valve 18, it being understood that this valve is always held in proper position so that it will seat promptly and accurately, this being due to the guiding fins or flanges.

When oil or other fluid is withdrawn from the tank or other receptacle, the air and gas pressure within the receptacle is reduced and atmospheric pressure, which has access to the inlet valve 32, through the hood and through the spider 26, will force valve 32 downwardly against the compression of spring 29, whereby a sufficient quantity of air under atmospheric pressure will flow through said valve member and into the tank or receptacle to permit the oil or other fluid to be withdrawn or discharged readily therefrom, the spring 29 closing the valve when the proper condition is reached.

It is seen that, due to the location of the adjusting screw 23, the spring pressure on outlet valve 18 may be regulated without the necessity of taking the valve apart in any manner whatsoever. When it is desired to adjust the tension of the spring on the inlet valve it is only necessary to remove the hood part by unfastening the bolts or screws 12 when the adjustment may be made by means of nut 33 without disturbing the connection of the body part of the valve to the pipe or other connection to the tank or receptacle. The simplicity of the valve makes it a very economical proposition to manufacture, the parts however seating accurately and with sufficient tightness to accomplish the purpose thereof.

Having described my invention, what 1 claim is:—

1. A device of the character described, including, in combination, a body member having a passage therethrough and provided with a valve seat at its upper edge, a hood member inverted over said body member and secured thereto, said hood member being wider than said body member so that the interior of the device has communication with the atmosphere, said hook member being provided with a plurality of guiding flanges, a double valve member positioned within said hood member and including an outlet valve member having an elongated cylindrical part having an imperforate side wall and adapted to engage and be guided by said flange members and to rest on said valve seat in said body member, said outlet valve member having a passage through its bottom wall and formed with a seat on its underside, an inlet valve member adapted to rest on said seat in said outlet valve and separate resilient means for holding each of said valves normally on their valve seats.

2. A device of the character described, including, in combination, a body member having a passage therethrough and provided with a valve seat at its upper edge, a hood member inverted over said body member and secured thereto, said hood member being wider than said body member so that the interior of the device has communication with the atmosphere, said hood member being provided with a plurality of radially disposed guiding flanges, a double valve member positioned within said hood member and including an outlet valve member having an elongated cylindrical part adapted to engage and be guided by said flange members and to rest on said valve seat in said body member, said outlet valve member having a passage therethrough and formed with a seat on its underside, a strainer over one end of the cylindrical valve, an inlet valve member adapted to rest on said seat in said outlet valve and close the other open end thereof and separate resilient means for holding each of said valves normally on their valve seats and means for adjusting the tension of said resilient means without disconnecting the valve body from the pipe or other part to which the same is connected.

3. A device of the character described, including, in combination, a body part having a valve seat, a hood part wider than said body part and positioned thereover, a double valve member within said hood member including an outlet valve adapted to fit said seat on said body member, means for normally holding said outlet valve on its seat, said outlet valve having a passage therethrough and provided with a seat, an inlet valve positioned on said seat in said outlet valve, means for holding said inlet valve normally on its seat and a strainer mounted in said hood to prevent the passage of foreign material through the inlet valve when open.

4. A device of the character described, including, in combination, a body part, a hood part inverted and positioned over said body part, said hood part being wider than said body part, so that atmospheric pressure has access to the interior thereof, an outlet valve having an extended cylindrical part and having a passage therethrough, an inlet valve for closing said passage through the outlet valve, and a strainer in the upper part of the hood extending below the upper edge of the cylindrical part of the outlet valve to prevent the passage of foreign material through the inlet valve when open.

5. A device of the character described, including, in combination, a body part, a hood part inverted and positioned over said body part, said hood part being wider than said body part, so that the interior thereof has communication with the atmosphere, said hood part having a plurality of guiding members formed on the inside thereof; an outlet valve member having an extended cylindrical part fitting said guiding members, said outlet valve member having a passage therethrough; an inlet valve closing said passage through the outlet valve, said guiding members being cut away to provide shoulders and a strainer positioned on said shoulders and extending below the upper edge of the cylindrical part of the outlet valve so as to prevent foreign material from entering through the inlet valve when open.

In testimony whereof I hereunto subscribe my name.

ARTHUR W. CASH.